United States Patent
Osafune et al.

(10) Patent No.: US 6,826,167 B2
(45) Date of Patent: Nov. 30, 2004

(54) MOBILE COMMUNICATION SYSTEM

(75) Inventors: Tatsuaki Osafune, Yokohama (JP); Katsuyoshi Kitai, Inagi (JP); Tohru Hoshi, Yokohama (JP); Tomohiro Hotta, Yokohama (JP); Koji Hirayama, Chigasaki (JP)

(73) Assignee: Hitachi, Ltd, Tokyo (JP)

( * ) Notice: Subject to any disclaimer, the term of this patent is extended or adjusted under 35 U.S.C. 154(b) by 604 days.

(21) Appl. No.: 09/919,913

(22) Filed: Aug. 2, 2001

(65) Prior Publication Data

US 2002/0072367 A1 Jun. 13, 2002

(30) Foreign Application Priority Data

Dec. 11, 2000 (JP) ...................................... 2000-381654

(51) Int. Cl.⁷ ................................................. H04Q 7/28
(52) U.S. Cl. ...................................... 370/338; 370/352
(58) Field of Search ................................. 370/351, 352, 370/465, 401, 328, 329, 338, 347, 442, 353, 354, 355, 356, 358, 360; 455/403, 407, 422, 425, 428, 433, 434, 435, 436, 439, 440, 442, 450, 451, 452, 455, 456, 457, 465, 427

(56) References Cited

U.S. PATENT DOCUMENTS 6,324,405 B1 * 11/2001 Young et al. ............ 455/456.1
6,370,126 B1 * 4/2002 De Baere et al. ........... 370/316

OTHER PUBLICATIONS

J. Loughney, G. Sidebottom, Guy Mousseau, S. Lorusso, L. Coede, G. Verwimp, J. Keller, F. Escobar, "SS7 SCCP–User Adaptation Layer (SUA)," Internet Draft, pp. 1–70.
"IP Network Architecture Model for cdma2000 Spread Spectrum Systems", 3$^{rd}$ Generation Partership Project 2 "3GPP2 Wireless NAM", All–IP NAM DRAFT Rev. 0.8.0 (NAM focus group).

* cited by examiner

Primary Examiner—Dang Ton
(74) Attorney, Agent, or Firm—Reed Smith LLP; Stanley P. Fisher, Esq.; Juan Carlos A. Marquez, Esq.

(57) ABSTRACT

A communication relay system is connected to a line switched mobile communication system adapted to accommodate therein mobile terminals through radio channels and a packet switched mobile communication system adapted to accommodate therein the mobile terminals through radio channels. When a connection request has been made to a portable terminal, the communication relay system judges whether the portable terminal of interest is connected either to the line switched mobile communication system or to the packet switched mobile communication system.

7 Claims, 13 Drawing Sheets

FIG. 4

| SUBSCRIBER NUMBER 401 | MOBILE TERMINAL NUMBER 402 | POSITION INFORMATION 403 | ROAMING NUMBER 404 | RESULT OF AUTHENTICATION 409 |
|---|---|---|---|---|
| XXX-YYY | ZZZ | 1010(MSC203) | N/A | 123465789abc |
| .. 405 | .. 406 | .. 407 | .. 408 | .. 410 |

FIG. 5

| SUBSCRIBER NUMBER 401 | MOBILE TERMINAL NUMBER 402 | POSITION INFORMATION 403 | ROAMING NUMBER 404 | RESULT OF AUTHENTICATION 409 |
|---|---|---|---|---|
| XXX-YYY | ZZZ | F0F0(IP NETWORK) | AAA-BBB | 123465789abc |
| .. 405 | .. 406 | .. 507 | .. 508 | .. 410 |

FIG. 6

| SUBSCRIBER NUMBER 601 | MOBILE TERMINAL NUMBER 602 | ADDRESS INFORMATION 603 | ROAMING NUMBER 604 |
|---|---|---|---|
| XXX-YYY | ZZZ | A.A.A.A | AAA-BBB |
| .. 605 | .. 606 | .. 607 | .. 608 |

MOBILE COMMUNICATION SYSTEM

BACKGROUND OF THE INVENTION

The present invention relates in general to a mobile communication system. More particularly, the invention relates to a mobile communication system in which the communication is carried out among a line switched mobile communication system, a packet switched mobile communication system and a line switched public switch.

In recent years, the Internet has rapidly come into wide use. The data communication in the Internet is carried out in the form of the IP packet which is obedient to the Internet Protocol (IP) defined in RFC791.

On the other hand, the mobile communication service has also rapidly developed. The mobile communication system has a radio section between a portable terminal and a base station, and a network section which is constituted by accommodation equipment for accommodating therein a base station, a switch, a database for subscriber management, and the like. In the specification of the present application, the network section will hereinafter be referred to as "the ground network". In the mobile communication system, the data communication traffic has been rapidly increased, and the discussion is actively carried out with respect to the data transfer in accordance with the IP in the ground network of the mobile communication system. At the present time, in the mobile communication, the voice communication in the ground network is carried out in accordance with the line switching system. With respect to the fact that the signal relating to the voice is transferred in the form of the IP packet in accordance with the packet communication system, the discussion is also actively carried out, and the cost merit due to the realization of the IP of the internal network is expected.

As for prior art of disclosing the mobile communication system which is obedient to the packet communication system, there is 3GPP2 (3rd Generation Partnership Project 2) SC.P000X (Citation 1). This mobile communication system is shown in FIG. 1. In FIG. 1, reference numeral 100 designates a mobile terminal which is accommodated in the mobile communication system through a radio channel. Reference numeral 104 designates a base station which is adapted to communicate with the mobile terminal 100 through the radio channel. The base station 101 is connected to an MSC server 102 through a communication channel. The MSC server 102 includes: the function of converting a voice call received from the base station 101 into the IP packet to send the IP packet thus obtained to an IP network 103; the function of converting the IP packet received from the IP network 103 into the voice call to send the voice call thus obtained to the base station 101; and the function of communicating with a Home Location Register (HLR) 104 for managing the position information of the mobile terminal to acquire the position information of the mobile terminal. Reference numeral 105 designates a Call Agent (CA) which is connected to the IP network 103 and a Public Switches Telephone Network (PSTN) 107 through communication lines, respectively, and which is adapted to convert the IP packet received from the IP network 103 and a call control signal received from the PSTN 107 into each other to carry out the relay. Reference numeral 106 designates a Media Gateway (MG) for converting the IP packet received from the IP network 103 and the voice signal received from the PSTN 107 into each other to carry out the relay. Also, reference numeral 108 designates a fixed telephone which is connected to the PSTN 107 through the communication line.

In the above-mentioned prior art, the IP packet is transferred through the inside of the mobile communication system, whereby the communication is carried out between the mobile terminal 100 and the fixed telephone 108. The CA 105 and the MG 106 are provided between the PSTN 107 of the line switching system and the IP network 103. The CA 105 and the MG 106 are electrically connected to each other by carrying out the signal conversion.

In addition, as for another prior art mobile communication system, there is the mobile communication system which is described in JP-A-2000-278737 (Citation 2) and which is adapted to carry out suitably the switching between the public mode and the private mode in accordance with the position of the portable communication terminal, in particular, the digital cordless telephone terminal which also serves as a PHS. Now, by the public mode is meant the mode in which the information communication is carried out through the base station as the terminal for sending/receipt installed for the public use and which is used when the mobile communication terminal is independently used in the destination of going out. On the other hand, by the private mode is meant the mode in which a specific telephone installed in a home or the like is used as the parent telephone, and the information communication is carried out through this parent telephone and which is used when the child telephone of a specific telephone is used as the mobile communication terminal in a home.

The above-mentioned mobile communication system is shown in FIG. 16. In FIG. 16, reference numeral 1601 designates a digital cordless telephone terminal which also serves as a PHS. Reference numeral 1602 designates a public base station which is adapted to accommodate therein the terminal 1601 having the public mode. Reference numeral 1603 designates a private base station which is adapted to accommodate therein the terminal 1601 having the private mode. Reference numeral 1604 designates a mobile communication system which is connected to the public base station 1602. Reference numeral 1605 designates a telephone network which is connected to the private base station 1603. Reference numeral 1606 designates a normal telephone terminal which is connected to the communication system 1605. Reference numeral 1607 designates position data which is present in the inside of the mobile communication system 1604 and in which the position information of the terminal 1601 is accumulated.

In this communication system, in the system for connecting the arrival-of-the-call using the position data 1607, when a user of a portable telephone is returning home, at a time point when he/she judges that he/she can communicate with the private base station 1603 in his/her home, he/she sends the request to delete the position information of himself/herself in the position data 1607 in the inside of the mobile communication system 1604 or the request to carry out the redirection of arrival-of-the-call. By carrying out the deletion of the position registration, the useless operation of the arrival-of-the-call is not carried out from the public base station 1602 for the request to carry out the communication from the telephone terminal 1606 to the terminal 1601. If the redirection of arrival-of-the-call is set, then this redirection is made arrive at the user-desired communication terminal.

In addition, as for a conventional example of the format with which the call control signal of the line switching system which is required for the mobile communication and the IP packet are converted into each other, there is "SS7SCCP-User Adaptation Layer" (Citation 3) as the Internet Draft of the IETF (Internet Engineering Task Force). As described in page 5 of this document, there is proposed the architecture for mapping Transaction Capabilities Application Part (TCAP) as the call control signal of the line switching system required for the mobile communication on the IP packet.

SUMMARY OF THE INVENTION

As described above, it is discussed that in the ground network of the mobile communication system, the line switching network is made proceed to the IP network. The present inventors found out that when making the line switching network proceed to the IP network, the following problem arises. That is, since it takes a lot of time to complete such proceeding, it is conceivable that when carrying out the proceeding, the line switching network and the IP network co-exist in the above-mentioned ground network. In this case, for example, the case where an accommodation equipment for accommodating therein the radio base station which is adapted to communicate with a portable terminal is connected to the line switching network, and the case where the accommodation equipment is connected to the IP network may be present depending on the area in which the portable terminal is used. Therefore, it is necessary to judge whether the portable terminal is connected to the line switching network or the IP network.

In the Citation 1 and the Citation 3, the discussion in the case as described above is not made. In addition, the mobile communication system described in the Citation 2 must be mounted with the function of judging whether or not the mobile terminal 1 can communicate with the private base station, and the function that the mobile terminal 1 sends the request to delete the position information of itself or the request to carry out the redirection of arrival-of-the-call.

In a communication system which an embodiment of the present invention discloses, a communication relay system which is connected to a line switched mobile communication system which is adapted to accommodate therein mobile terminals through radio channels, a packet switched mobile communication system which is adapted to accommodate therein the mobile terminals through radio channels, and a public switch relays the communication between the line switched mobile communication system and the packet switched mobile communication system, or the communication among the line switched mobile communication system and the packet switched mobile communication system, and the public switch. The above-mentioned communication relay system, when the request of the connection to a portable terminal has been made, judges whether the portable terminal is accommodated either in the line switched mobile communication system or in the packet switched mobile communication system. The computers which are adapted to manage the position information of the portable terminals which are accommodated in the line switched mobile communication system and the packet switched mobile communication system, respectively, are provided in the line switched mobile communication system and the packet switched mobile communication system, respectively. When the portable terminal as the destination of the connection is accommodated in the line switched mobile communication system, the communication relay system inquires the computer which is provided in the line switched mobile communication system and which is adapted to manage the position information of the position information of that portable terminal, while the portable terminal as the destination of the connection is accommodated in the packet switched mobile communication system, inquires the computer which is provided in the packet switched mobile communication system and which is adapted to manage the position information of that portable terminal.

The details of the communication system disclosed in the present application will be described later.

BRIEF DESCRIPTION OF THE DRAWINGS

The novel features which are considered characteristic of the invention are set forth with particularly in the appended claims. The invention itself, however, and additional objects and advantages thereof will best be understood from the following description of embodiments thereof when read in connection with the accompanying drawings, in which:

FIG. 4 is a diagram showing explaining the position information which a Home Location Register (HLR) holds when a mobile terminal is accommodated in the mobile communication system;

FIG. 5 is a diagram showing explaining the position information which an HLR holds when a mobile terminal is accommodated in an IP network;

FIG. 6 is a diagram showing explaining the address information which a Session Initiation Protocol (SIP) holds when a mobile terminal is accommodated in an IP network;

DETAILED DESCRIPTION OF THE EMBODIMENTS

The embodiments of the present invention will hereinafter be described in detail with reference to the accompanying drawings.

First of all, a first embodiment of the present invention will hereinbelow be described.

Figure 1:
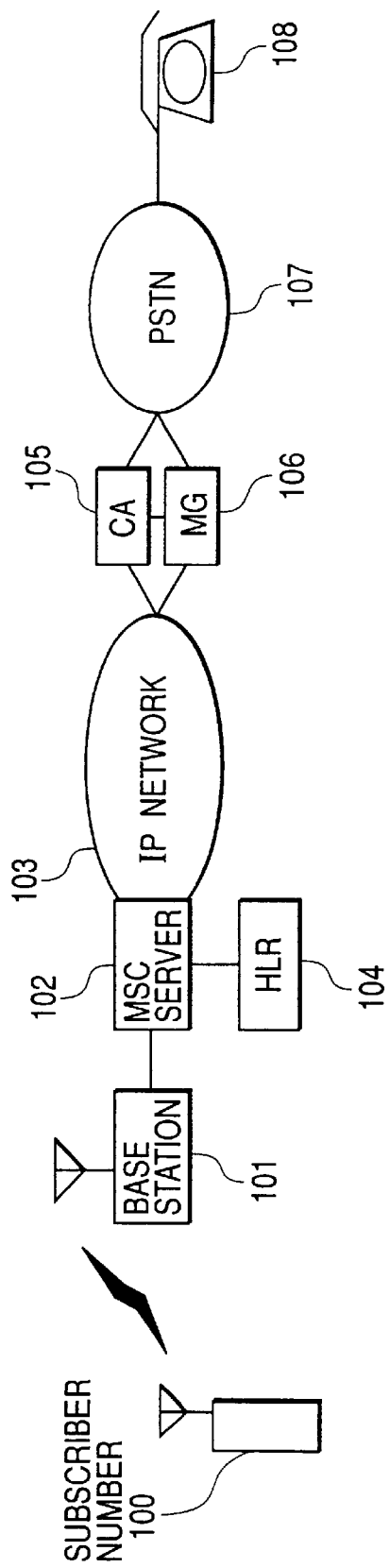
FIG. 1 is a schematic view showing the construction of a mobile communication system which is described in 3GPP2SC.P000X.
Figure 2:
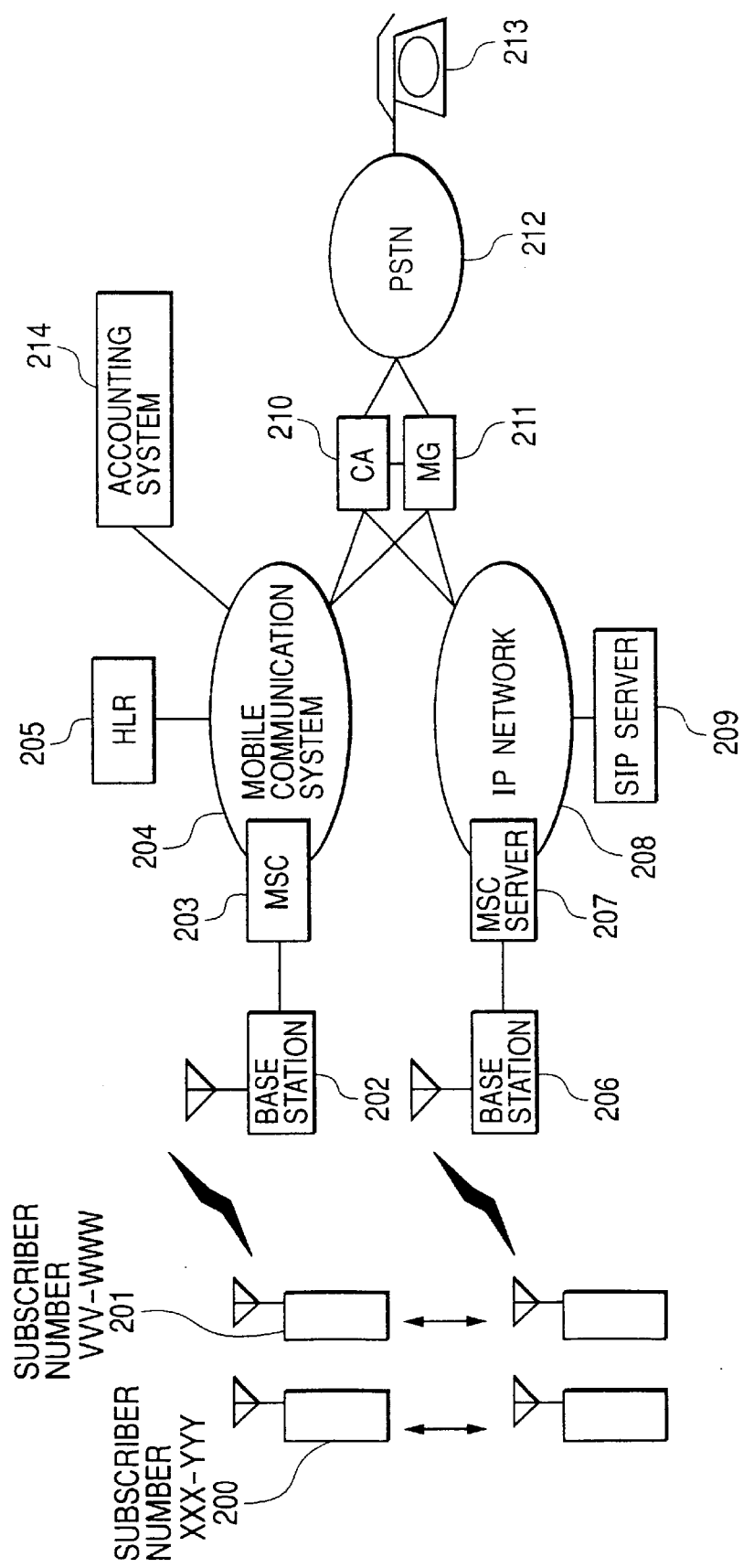
FIG. 2 is a schematic block diagram showing the construction of a mobile communication system according to a first embodiment of the present invention.

FIG. 2 shows a first embodiment of a mobile communication system which the present application discloses. In FIG. 2, reference numerals 200 and 201 designate respectively mobile terminals which are accommodated in a mobile communication system through radio channels. Reference numeral 202 designates a base station which is adapted to communicate with the mobile terminal 201 through a radio channel. The base station 202 is connected to a Mobile Switching Center (MSC) 203 through a communication line. The MSC 203 is a part of a mobile communication system 204 which is adapted to carry out the communication in accordance with the line switching system, and voice at the mobile terminal is transferred through the mobile communication system 204. Reference numeral 205 designates a Home Location Register (HLR) in which when the mobile terminal 201 has been connected to the mobile communication system 204 through the radio channel, the base station 202 and the mobile switching center 203, the position information of the mobile terminals 200 and 201 is registered. Reference numeral 206 designates a base station which is adapted to communicate with the mobile terminals 200 and 201 through radio channels. The base station 206 is connected to an MSC server 207 through a communication line. Now, by the MSC server is meant the server for carrying out the same operation as that of the MSC for the communication with the base station 206 to emmulate the MSC 203. In addition, the MSC server 207 has the function of converting the call control signal and the voice data sent from the base station into the IP packets to transfer these IP packets to the IP network 208 which is adapted to carry out the communication on the basis of the packet switching. In addition, the MSC server 207 has also the function of converting the IP packets received from the IP network 208 into the call control signal and the voice data. Reference numeral 209 designates a Session Initiation Protocol (SIP) server in which when the mobile terminal 200 or 201 has been connected to the IP network 208 through the radio channel, the base station 206 and the MSC server 207, the position information of the mobile terminal 200 or 201 is registered. Reference numeral 210 designates a Call Agent (CA) for converting the call control signal of the line switching system and the call control signal of the packet switching system into each other. Reference numeral 211 designates a Media Gateway (MG) for converting the voice calls having mutually different formats into each other. The CA 210 and the MG 211 can communicate with each other and the CA 210 issues a direction, required for the call control, such as the resource ensuring request to the MG 211. Reference numeral 212 designates a Public Switched Telephone Network (PSTN). Reference numeral 213 designates an ordinary fixed telephone which is connected to the PSTN 212 through a communication line. Reference numeral 214 designates an accounting system which is connected to the HLR 205 through a communication line. The different three networks, i.e., the mobile communication system 204, the IP network 208 and the PSTN 212 are connected via the CA 210 and the MG 211 through the communication lines. The mobile terminals accommodated in the mobile communication system 204 or the mobile terminals accommodated in the IP network 208 can communicate with each other through the radio channel, the base station, and the MSC or the MSC server.

Figure 3:
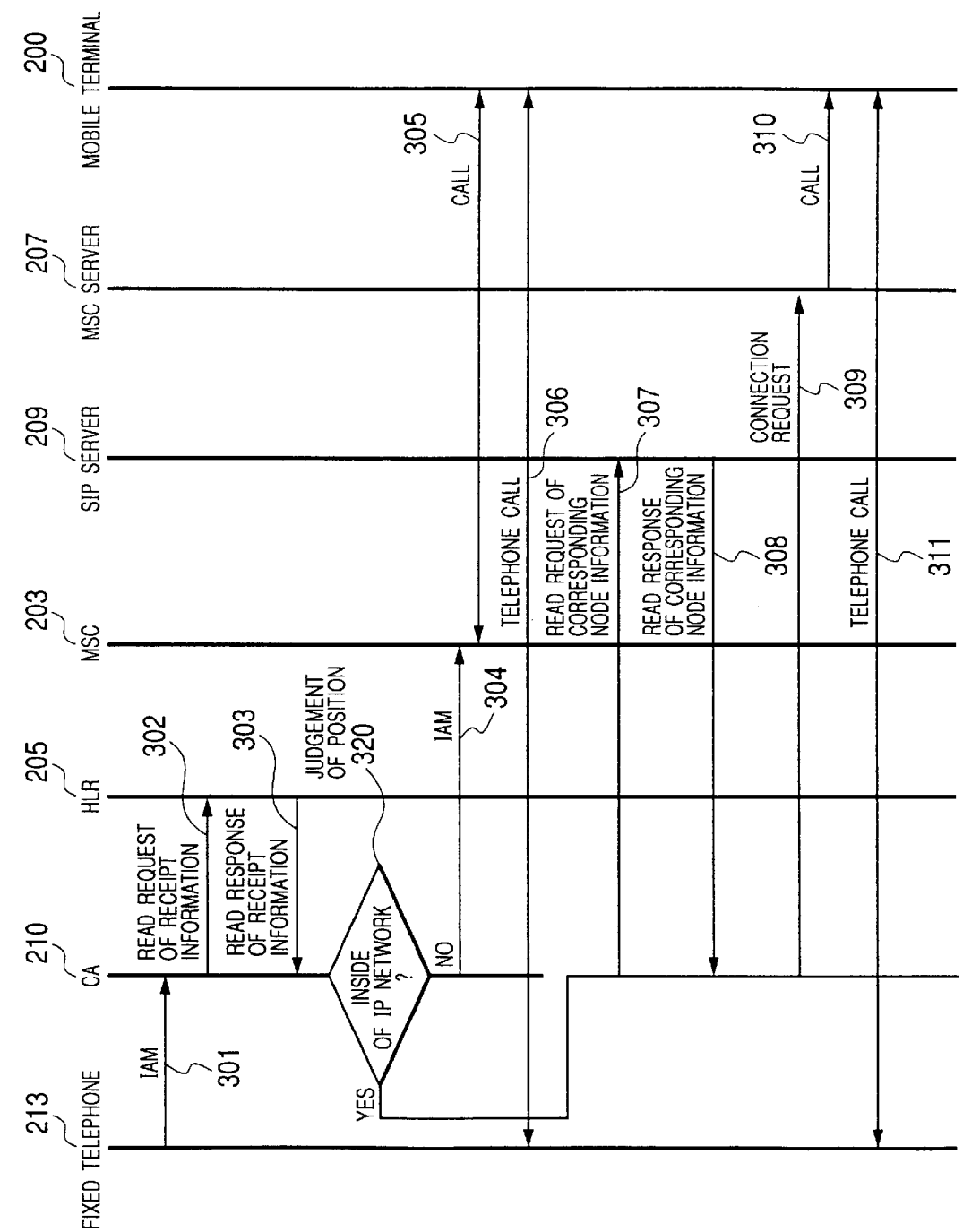
FIG. 3 is a flow chart useful in explaining the operation of the mobile communication system according to the first embodiment of the present invention.

The description will hereinbelow be given with respect to the case where the fixed telephone 213 intends to communicate with the mobile terminal 200 with reference to FIG. 3. FIG. 3 shows the process of carrying out the call-connection from the fixed telephone 213 to the mobile terminal 200. First of all, the fixed telephone 213 sends the Initial Address Message (IAM) 301 for a subscriber number XXX-YYY to the CA 210 through the PSTN 212. The position information of the mobile terminal 200 corresponding to the subscriber number XXX-YYY is registered in the HLR 205. This registration is carried out on the basis of the normal sequence when the mobile terminal 200 is accommodated in the mobile communication system 204, and is carried out on the basis of the sequence which will be described later when the mobile terminal is accommodated in the IP network 208. In order to read out the position information thus registered, the CA 210 sends a read request 302 of receipt information to the HLR 205. On the other hand, the HLR 205 returns a read response 303 of receipt information to the CA 210 to notify the CA 210 of the position information.

The position information which the HLR 205 holds when the mobile terminal 200 is accommodated in the mobile communication system 204 is shown in FIG. 4. In FIG. 4, reference numeral 401 designates a subscriber number, and reference numeral 402 designates a mobile terminal number becoming an identifier of the mobile terminal. XXX-YYY 405 as the subscriber number of the mobile terminal 200 and an identifier number ZZZ 406 of the mobile terminal are registered in the respective items. Reference numeral 403 designates position information exhibiting the position of the mobile terminal, and the position information of the mobile terminal 200 is expressed in the form of the point code in an item 407. Reference numeral 404 designates a roaming number which is assigned when the mobile terminal is accommodated in the IP network 208. When the mobile terminal 200 is accommodated in the mobile communication system 204, as shown in an item 408, the MSC 203 which is adapted to carry out the communication through the radio channel is registered in the form of the position information, but the roaming number is not registered. The HLR 205 notifies the CA 200 of the position information of 407 in the form of the read response of receipt information.

In FIG. 3, from the result of the read response 303 of receipt information, the CA 210 carries out a judgement 320 of position whether the mobile terminal 200 is accommodated in the mobile communication system 204 or is connected to the IP network 208. When it is judged that the mobile terminal 200 is connected to the mobile communication system 204, it is understood that the connection may be carried out to the MSC 203 from the position information 407 shown in FIG. 4. Then, the CA 210 operates as the Gateway MSC (GMSC) for this communication and sends an IAM 304 to the MSC 203. Then, after having made a call to the mobile terminal 200, the MSC 203 notifies the MG 211 of that it operates as the GMSC, whereby a telephone call 306 between the fixed telephone 213 and the mobile terminal 200 is started.

The position information which the HLR 205 holds when the mobile terminal 200 is accommodated in the IP network 208 is shown in FIG. 5. The items and the contents of 401, 402, 403, 404, 405 and 406 are the same as those shown in FIG. 4. The contents of 507 are different from those of 407, and a point code, as the position information, expressing that the mobile terminal 200 is connected to the IP network 208 is registered therein. In addition, the contents of 508 are different from those of 408, and the roaming number which is assigned when the mobile terminal 200 is accommodated in the IP network 208 is registered therein.

In FIG. 3, from the result of the read response 303 of receipt information, the CA 210 carries out the judgement 320 of position whether the mobile terminal 200 is accommodated in the mobile communication system 204 or is connected to the IP network 208. When it is judged that the mobile terminal 200 is connected to the IP network 208, from the position information 507 and the roaming number 508 shown in FIG. 5, the CA 210 understands that the mobile terminal 200 is connected to the IP network 208. Then, the CA 210 sends a read request 307 of corresponding node information of the mobile terminal 200 with the roaming number 508 as a key to the SIP server 209 for managing the position information of the mobile terminal accommodated in the IP network 208. Then, the SIP server 209 returns a read response 308 of corresponding node information to the CA 210. The IP address information which is used to connect the fixed telephone 213 to the mobile terminal 200 is contained in the read response 308 of corresponding node information.

The information which the SIP server 209 holds is shown in FIG. 6. In FIG. 6, reference numeral 601 designates a subscriber number, and reference numeral 602 designates a mobile terminal number becoming the identifier of the mobile terminal. XXX-YYY 605 as the subscriber number of the mobile terminal 200, and an identifier number ZZZ 606 of the mobile terminal are registered in the respective items. Reference numeral 603 designates address information which is required for the packet to arrive at the mobile terminal, and reference numeral 604 designates a roaming number which is assigned when the mobile terminal 200 is accommodated in the IP network 208. When the mobile terminal 200 is accommodated in the IP network 208, the IP address of the MSC server 207 which is adapted to carry out the communication through the radio channel is registered as the address information, and a roaming number AAA-BBB 608 which is assigned to the mobile terminal 200 is registered as the roaming number.

In FIG. 3, the CA 210 which has received the read response 308 of corresponding node information becomes aware of the IP address of the MSC server 207 from the IP address information and sends a connection request 309 to the MSC server 207. Then, the MSC server 207 makes a call 310 of the mobile terminal 200. Thereafter, the CA 210, similarly to the CA 105 and the MG 106 described in the prior art, with respect to this communication, directs the MG 211 to carry out the conversion between the signal of the line switching system and the IP packet. As a result, a call between the fixed telephone 213 and the mobile terminal 200 is started. In such a way, the communication can be carried out on the basis of the sequence shown in FIG. 3 even when the mobile terminal 200 is accommodated in the mobile communication system 204 as well as even when the mobile terminal 200 is accommodated in the IP network 208.

Figure 7:
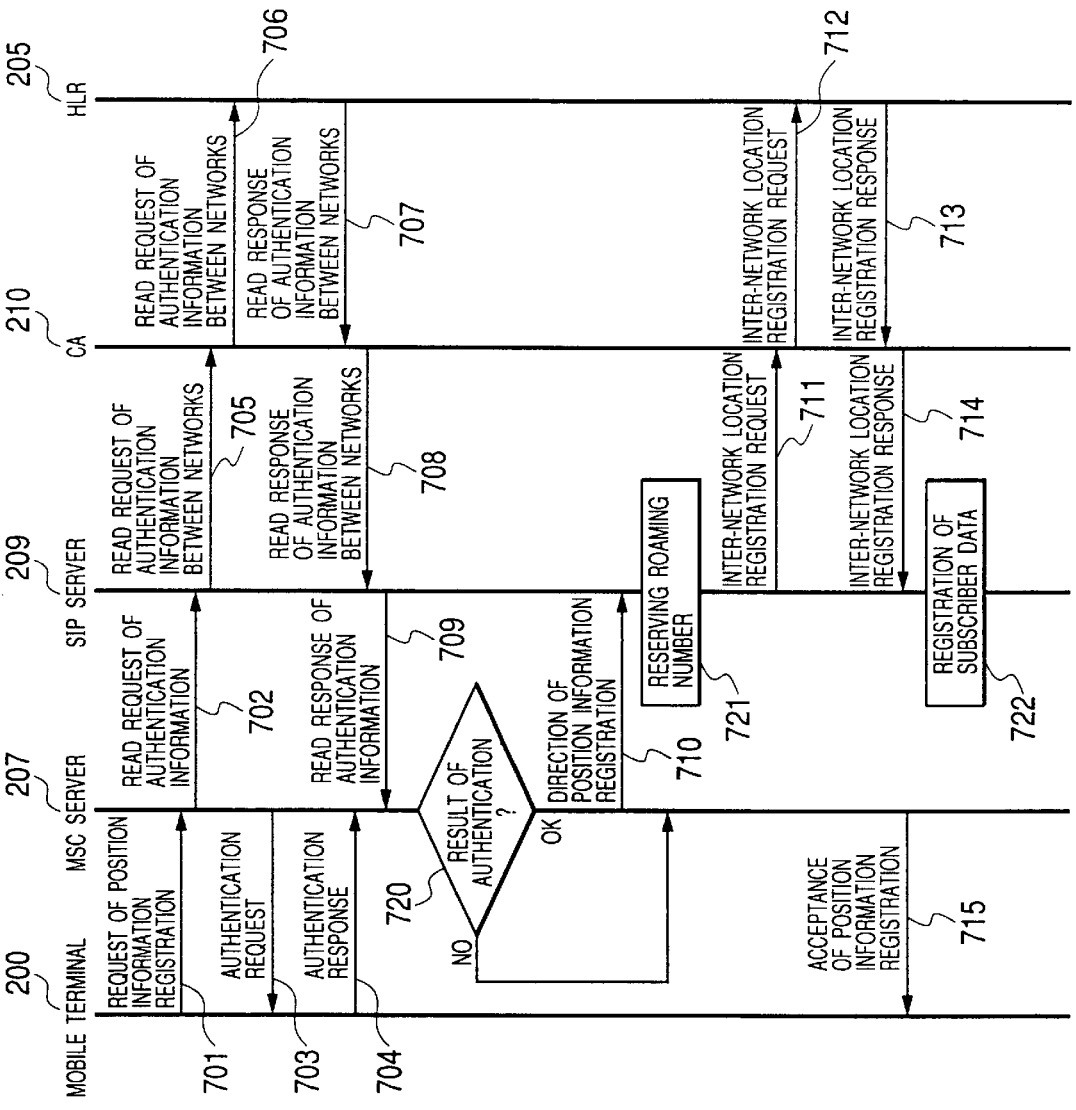
FIG. 7 is a flow chart for explaining the communication sequence when a mobile terminal carries out the position registration for an SIP server and an HLR.

Next, the description will hereinbelow be given with respect to the registration sequence, for the HLR 205 when the mobile terminal is accommodated in the IP network 208, which has been previously described. FIG. 7 shows the position information registration sequence of the mobile terminal which is carried out when the mobile terminal 200 is accommodated in the IP network 208. In FIG. 7, reference numeral 701 designates a request of position information registration which is made when the mobile terminal 200 becomes able to communicate with the MSC server 207 through a radio channel by the activation or the movement of the mobile terminal 200. After the mobile terminal 200 sent the request 701 of position information request to the MSC server 207, the MSC server 207 which has received this request 701 of position information request, in order to acquire authentication information of the mobile terminal 200, sends a read request 702 of authentication information to the SIP server 209. At the same time, the MSC server 207 sends an authentication request 703 to the mobile terminal 200. The mobile terminal 200 which has received the authentication request 703 returns an authentication response 704 to the MSC server 207.

On the other hand, the SIP server 209 which has received the read request 702 of authentication information sends a read request 705 of authentication information between networks to the HLR 205 which manages collectively the authentication information of the mobile terminals. At this time, the IP packet which has been sent from the SIP server 209 is received by the CA 210. The CA 210 converts the read request 705 of authentication information between networks thus received into the call control signal of the line switching system to transfer the signal thus obtained as a read request 706 of authentication information between networks to the HLR 205. The HLR 205 which has received the read request 706 of authentication information between networks sends a read response 707 of authentication information between networks to the SIP server 209. At this time, the read response 707 of authentication information between networks as the call control signal of the line switching system sent from the HLR 205 is received by the CA 210. Then, the CA 210 converts the read response 707 of authentication information between networks into the IP packet to send the IP packet thus obtained in the form of a read response 708 of authentication information between networks to the SIP server 209. The authentication information 410 of the mobile terminal 200 shown in FIG. 5 is contained in the read response 708 of authentication information between networks. The SIP server 209 which has received the read response 708 of authentication information between networks can be aware of the authentication information 410 of the mobile terminal 200 on the basis of that response 708. Then, the SIP server 209 sends a read response 709 of authentication information as the answer of the read request 702 of the authentication information which has been previously received to the MSC server 207.

The MSC server 207 compares the authentication response 704 received from the mobile terminal 200 and the read response 709 of authentication information received from the SIP server 209 with each other to judge the authentication result (Step 720). When the authentication has proved unsuccessful, the MSC server 207 notifies the mobile terminal 200 of the effect that the authentication has proved unsuccessful. On the other hand, when the authentication has proved successful, the MSC server 207 starts the position registration processing. First of all, the MSC server 207 sends a direction 710 of position information registration containing the IP address of itself to the SIP server 209. The SIP server 209 which has received the direction 710 of position information registration reserves the roaming number of the mobile terminal 200 (Step 721). Next, the SIP server 209 sends an inter-network location registration request 711 to the CA 210. The subscriber number 405 of the mobile terminal, the mobile terminal number 406 and the roaming number 508 are contained in the inter-network location registration request 711. The CA 210 which has received the inter-network position registration request 711 converts the inter-network location registration request as the IP packet into the signal of the line switching system to transfer the signal thus obtained in the form of an inter-network location registration request 712 to the HLR 215.

Then, the HLR 205 generates a table shown in FIG. 5 from such information. In addition, the HLR 205 sends an inter-network location registration response 713 to the SIP server 209. The CA 210 which has received the inter-network location registration response 713 as the signal of the line switching system converts this response 713 thus received into the IP packet to transfer the IP packet thus obtained as an inter-network location registration response 714 to the SIP server 209. The SIP server 209 which has received the inter-network location registration response 714 registers subscriber data 722. This subscriber data 722 includes the subscriber number 605, the mobile terminal number 606, the IP address 607 of the MSC server 207, and the roaming number 608.

Next, the description will hereinbelow be given with respect to the case where the mobile terminal 200 intends to communicate with the mobile terminal 201. When both of the mobile terminals 200 and 201 are accommodated in the mobile communication system 204 through the radio channels and the base station, the communication can be carried out through the communication process of the normal mobile communication system. In addition, when both of the mobile terminals 200 and 201 are accommodated in the IP network 208 through the radio channels and the base station, the communication can be carried out through the communication process of the normal IP network.

The description will hereinbelow be given with respect to the case where one mobile terminal is accommodated in the mobile communication system 204, while the other mobile terminal is accommodated in the IP packet 208 with reference to FIG. 8 and FIG. 9.

Figure 8:
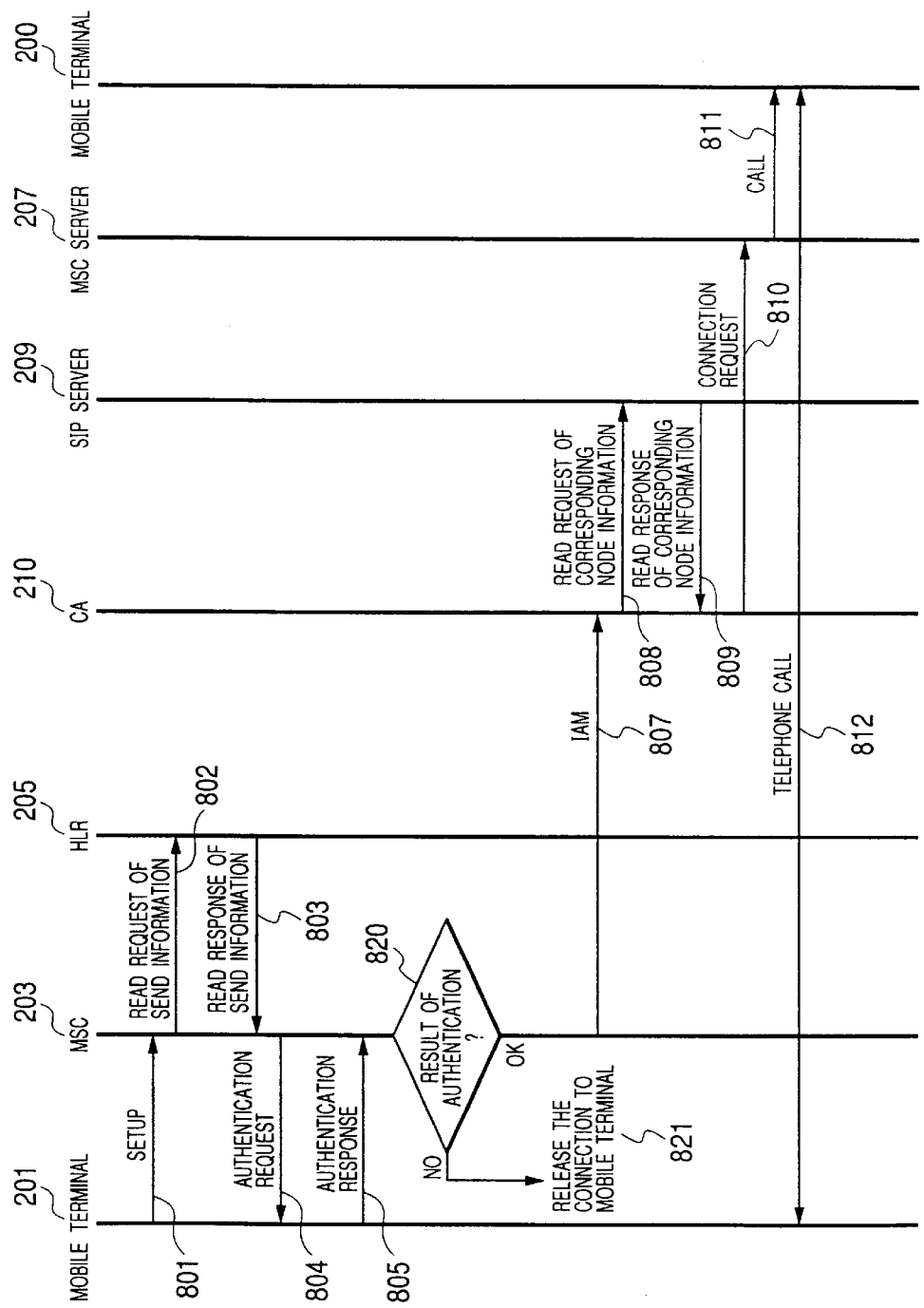
FIG. 8 is a flow chart for explaining the operation of a mobile communication system when a mobile terminal accommodated in a mobile communication system communicates with a mobile terminal accommodated in an IP network.

FIG. 8 shows the sequence when the mobile terminal 201 accommodated in the mobile communication system 204 communicates with the mobile terminal 200 accommodated in the IP network 208. First of all, the mobile terminal 201 carries out the sending (SETUP 801) to the subscriber number of the mobile terminal 200 for the MSC 203. The MSC 203 which has received SETUP 801 sends a read request 802 of send information to the HLR 205. The HLR 205 which has received the read request 802 of send information returns a read response 803 of send information to the MSC 203. The authentication information is contained in this read response 803 of send information. In addition, the MSC 201 sends an authentication request 804 to the mobile terminal 201. The mobile terminal 201 which has received the authentication request 804 sends an authentication response 805 to the MSC 203. Then, the MSC 203 compares the authentication information received from the HLR 205 with the authentication information received from the mobile terminal 201 to judge the authentication result (Step 820). When the authentication has proved unsuccessful, the MSC 203 releases the mobile terminal 200 to complete a series of sequences (Step 821). On the other hand, when the authentication has proved successful, the MSC 203 sends an IAM 807 containing the roaming number of the mobile station 200 as the information to the CA 210. The CA 210 which has received the IAM 807 sends a read request 808 of corresponding node information to the SIP server 209. The SIP server 209 which has received the read request 808 of corresponding node information retrieves address information (refer to FIG. 6), which is registered through the registration sequence shown in FIG. 7, with the roaming number as a key. Then, the SIP server 209 transfers a read response 809 of corresponding node information, as the retrieval result, containing the address information 607 of the MSC server 207 to the CA 210. The CA 210 becomes aware of the address information 607 of the MSC server 207 from the read response 809 of corresponding node information to send a authentication request 810 to the MSC server 207. The MSC server 207 which has received the connection request 810 makes a call 811 through the radio channel, and as a result the telephone call is started between the mobile terminal 201 and the mobile terminal 200 (Step 812).

Figure 9:
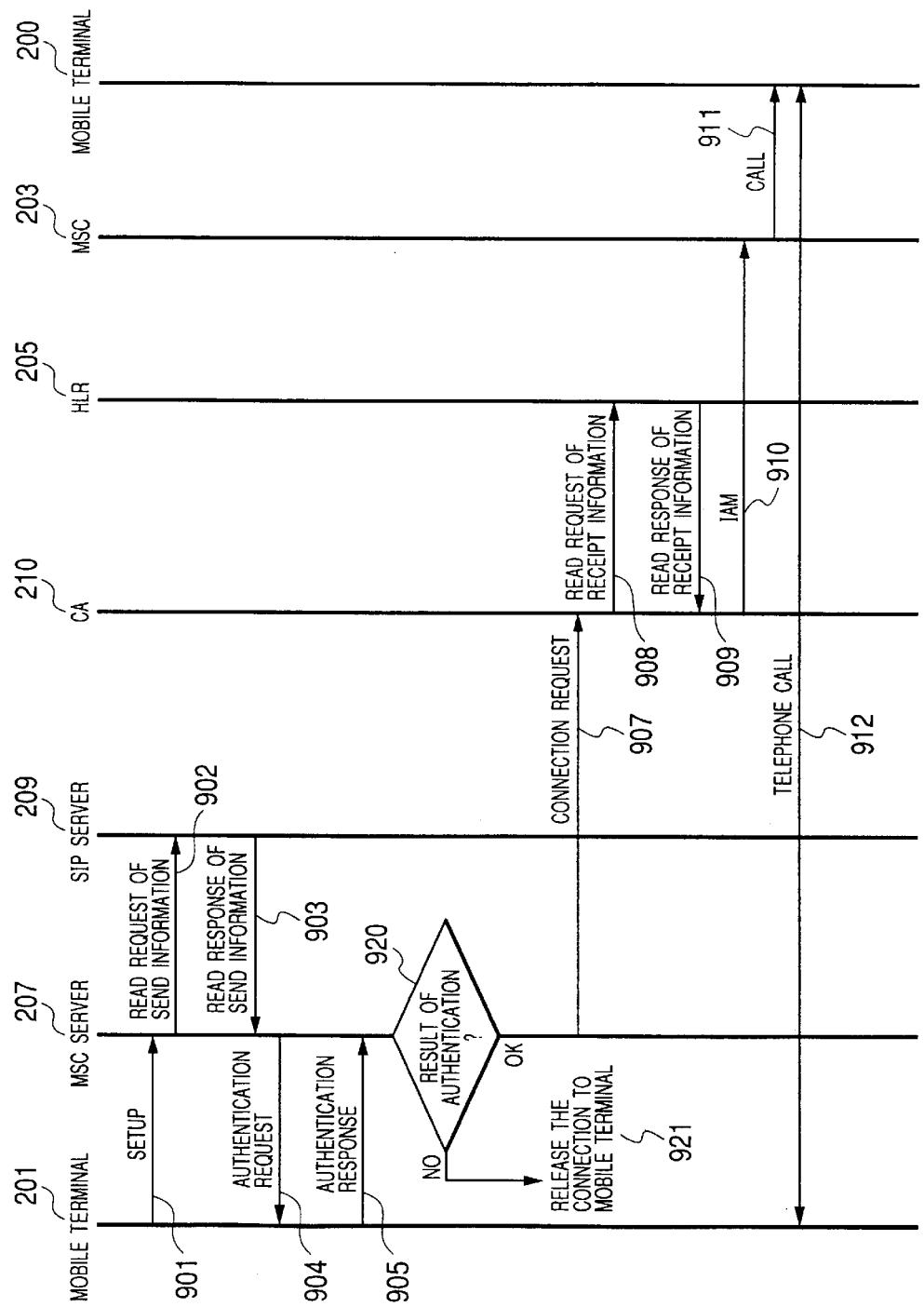
FIG. 9 is a flow chart for explaining the operation of a mobile communication system when a mobile terminal accommodated in an IP network communicates with a mobile terminal accommodated in a mobile communication system.

FIG. 9 shows the sequence when the mobile terminal 201 accommodated in the IP network 208 communicates with the mobile terminal 200 accommodated in the mobile communication system 204. First of all, the mobile terminal 201 carries out the sending (SETUP 901) to the subscriber number of the mobile terminal for the MSC server 207. The MSC server 207 which has received the SETUP 901 sends a read request 902 of send information to the SIP server 209.

The SIP server 209 which has received the read request 902 of send information returns a read response 903 of send information to the MSC server 207. The authentication information is contained in the read response 903 of send information. In addition, the MSC server 207 sends an authentication request 904 to the mobile terminal 201. The mobile terminal 201 which has received the authentication request 904 sends an authentication response 905 to the MSC server 207. Then, the MSC server 207 compares the authentication information received from the SIP server 209 with the authentication information received from the mobile terminal 201 to judge the authentication result (Step 920). When the authentication has proved unsuccessful, the MSC server 207 releases the mobile terminal 201 to complete a series of sequences (Step 921). On the other hand, when the authentication has proved successful, the MSC server 207 sends a connection request 907 containing the roaming number of the mobile terminal as the information to the CA 210. The CA 210 which has received the connection request 907 sends a read request 908 of receipt information to the HLR 205. The HLR 205 which has received the read request 908 of receipt information retrieves the address information (refer to FIG. 6), which is registered through the registration sequence shown in FIG. 7, with the roaming number as a key. As a result of the retrieval, the HLR 205 transfers a read response 909 of receipt information containing the point code 407 as the position information of the MSC 203 to the CA 210. The CA 210 becomes aware of the position information 407 of the MSC 203 from the read response 909 of receipt information to send an IAM 910 to the MSC 203. The MSC 203 which has received the IAM 910 makes a call 911 through the radio channel, and as a result a telephone call is started between the mobile terminal 201 and the mobile terminal 200.

Figure 10:
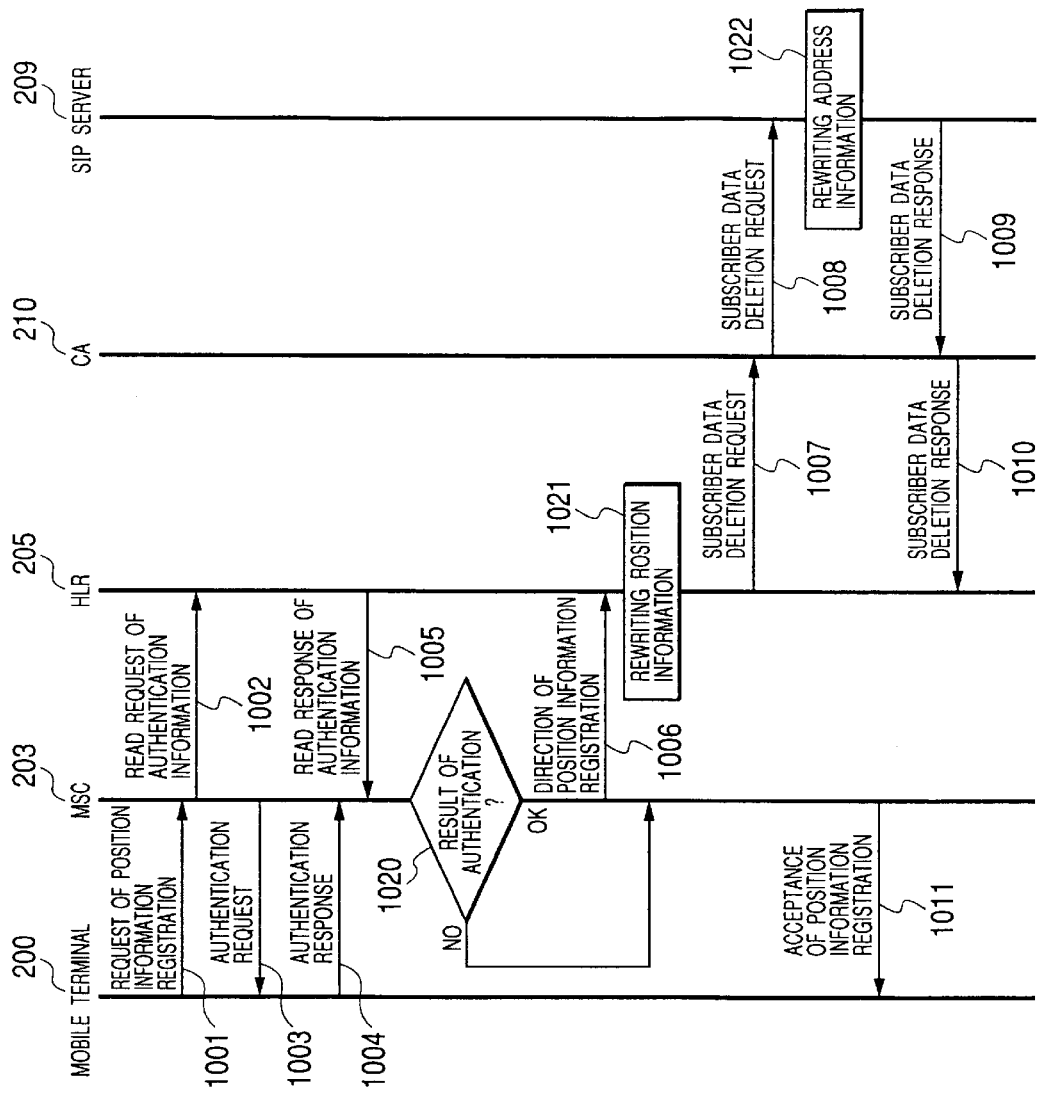
FIG. 10 is a flow chart for explaining the position registration sequence when after having been accommodated in an IP network, a mobile terminal is accommodated in a line switching network.

Next, FIG. 10 shows a position information registration sequence in the case where the mobile terminal 200 is accommodated in the IP network 208, the position information registration sequence shown in FIG. 7 is completed and then the mobile terminal 200 is accommodated in the mobile communication system 204. Since this sequence is provided after completion of the position information registration sequence shown in FIG. 7, the information which the HLR 205 holds is as shown in FIG. 5, and the information which the SIP server 209 holds is as shown in FIG. 6.

When the mobile terminal 200 has been moved to the mobile communication system 204, first of all, the mobile terminal 200 sends a request 1001 of position information registration to the MSC 203. The MSC 203 which has received the request 1001 of position information registration sends a read request 1002 of authentication information and also sends an authentication request 1003 to the mobile terminal 200. The mobile terminal 200 receives the authentication request 1003 and sends, as the answer thereof, an authentication response 1004 to the MSC 203. In addition, the HLR 205 which has received the read request 1002 of authentication information sends, as the answer thereof, a read response 1005 of authentication information containing the authentication information 410 of the mobile terminal 200 to the MSC 203. The MSC 203 which has received the authentication response 1004 and the read response 1005 of authentication information compares the authentication response 1004 and the read response 1005 of authentication information with each other to calculate the authentication result (Step 1020). When the authentication has proved unsuccessful, the MSC 203 notifies the mobile terminal 200 of that effect to complete a series of position registration (Step 1011). On the other hand, when the authentication has proved successful, the MSC 203 sends a direction 1006 of position information registration to the HLR 205. The HLR 205 which has received the direction 1006 of position information registration carries out rewriting 1021 of position information. As a result, the information of position information registration of the mobile terminal 200 which the HLR 205 holds is changed from FIG. 5 to FIG. 4. The HLR 205 which has completed rewriting of position information (Step 1021) sends a subscriber data deletion request 1007 to the CA 210. This subscriber data deletion request 1007 is the signal of the line switching system and is received by the CA 210. The CA 210 which has received the subscriber data deletion request 1007 converts the subscriber data deletion request 1007 thus received into the IP packet to transfer the IP packet thus obtained in the form of a subscriber data deletion request 1008 to the SIP server 209. The SIP server 209 which has received the subscriber data deletion request 1008 carries out rewriting 1022 of address information. In this case, the line(s) corresponding to the mobile terminal 200 is(are) deleted from the state shown in FIG. 6. After completion of rewriting 1022 of address information, the SIP server 209 sends a subscriber data deletion response 1009 in the form of the IP packet to the HLR 205. After having received the subscriber data deletion response 1009, the CA 210 converts the IP packet into the signal of the line switching system to transfer the signal thus obtained in the form of a subscriber data deletion response 1010 to the HLR 205.

On the basis of the position information registration sequences shown in FIG. 7 and FIG. 10, even when the mobile terminal 200 is accommodated either in the mobile communication system 204 or in the IP network 208, the mobile terminal 200 can detect properly either the position information or the address information through the sequences shown in FIG. 3, FIG. 8 and FIG. 9.

Figure 11:
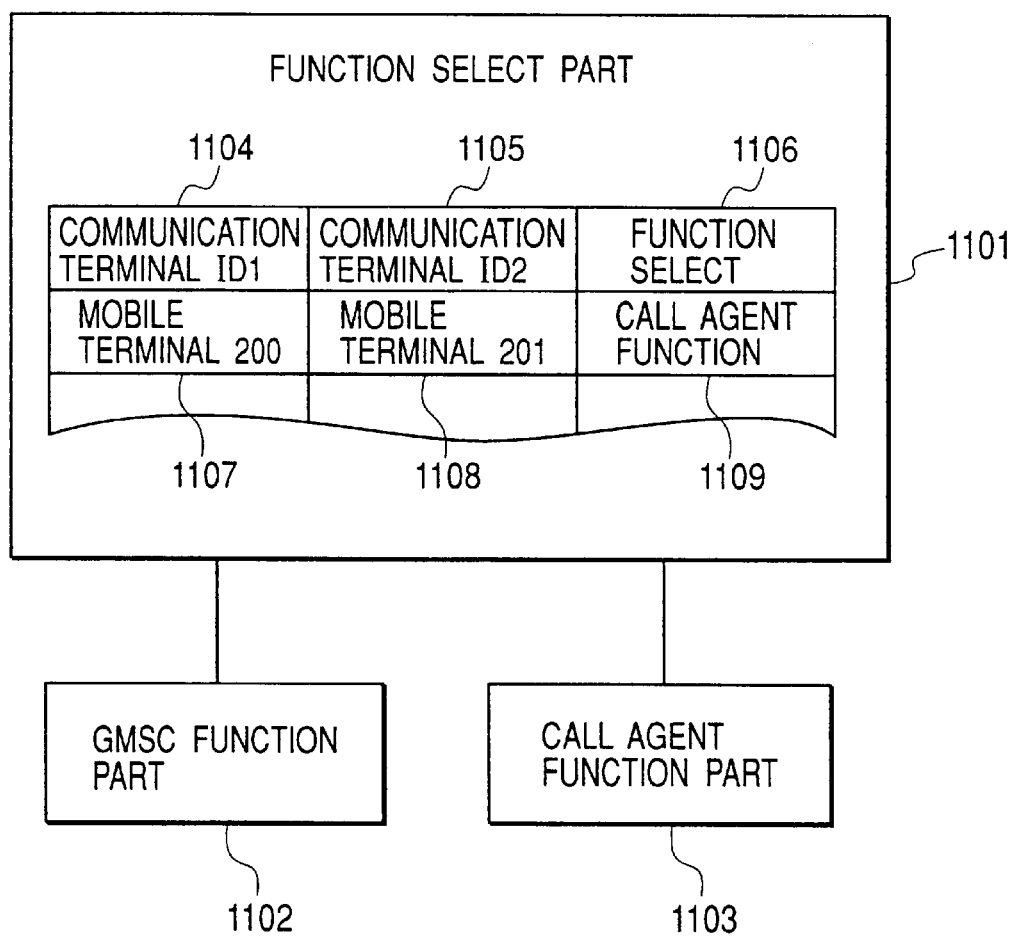
FIG. 11 is a functional block diagram showing a configuration of a communication relay system of the present invention.

A functional block diagram of the CA 210 is shown in FIG. 11. As previously described, the CA 210 selects whether it functions as the GMSC or as the CA in accordance with which of the mobile communication system 204 or the IP network 208 the network having the mobile terminal accommodated therein is. For this reason, the CA 210 includes a function select part 1101 for selecting whether the CA 210 functions as the GMSC or as the CA every communication, a GMSC function part 1102 which is adapted to function when it is selected by the function select part 1101 that the CA 210 functions as the GMSC, and a Call Agent (CA) function part 1103 which is adapted to function when it is selected by the function select part 1101 that the CA 210 functions as the CA. The function select part 1101 holds a table having a communication terminal ID1 (1104), a communication terminal ID2 (1105) and a function select 1106. In an example shown in FIG. 11, the mobile terminal 200 is registered as the communication terminal ID1 (1104), the mobile terminal 201 is registered as the communication terminal ID2 (1105), and a Call Agent function 1109 is registered as the function select 1106. For this reason, in the communication between the mobile terminals 200 and 201, the signal of the line switching system and the IP packet are converted into each other.

Figure 12:
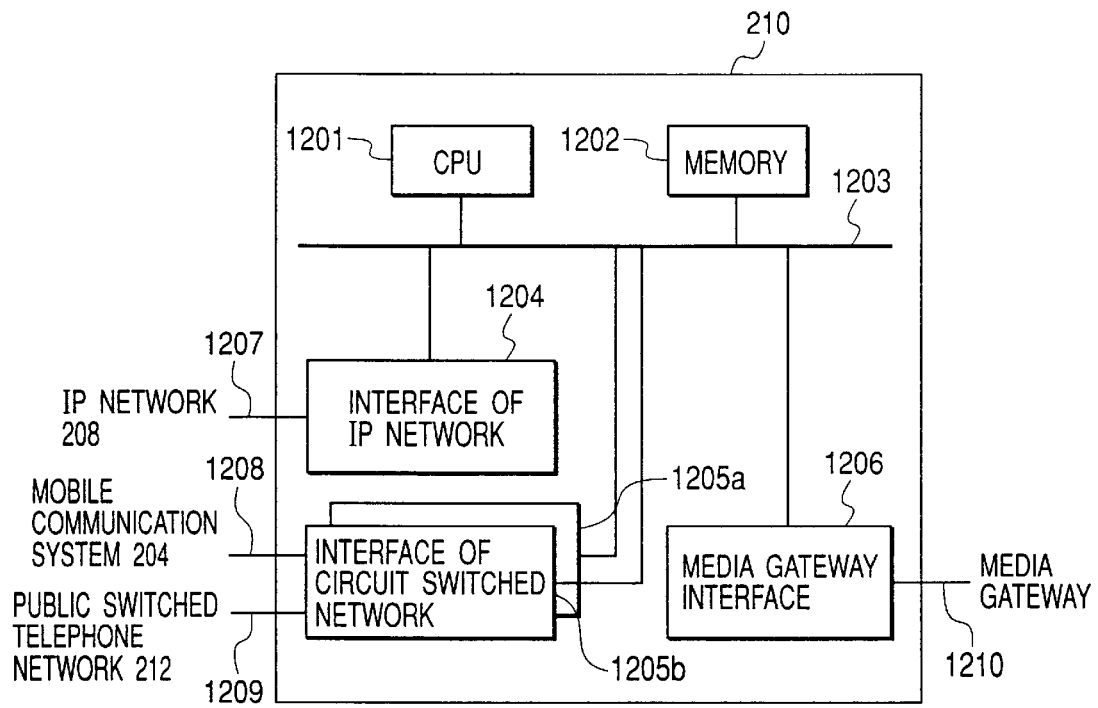
FIG. 12 is a block diagram showing a configuration of a CA.

A configuration of the CA 210 is shown in FIG. 12. The CA 210 includes: a CPU 1201 for executing the calculation processing by which the functions of FIG. 11 are realized; a memory 1202; an interface 1204 of IP network connected to a line 1207 through which the CA 210 is connected to the IP network 208; an interface 1205a of line switched network connected to a line 1208 through which the CA 210 is connected to the mobile communication system 204; an interface 1205b of line switched network connected to a line 1209 through which the CA 210 is connected to the PSTN 1212; a Media Gateway interface 1206 connected to a line 1210 through which the CA 210 is connected to the MG 211; and an internal bus 1203 through which the CPU 1201, the memory 1202, the interface 1204 of IP network, the interface 1205 of line switched network, and the Media Gateway interface 1206 are connected to one another.

Figure 13:
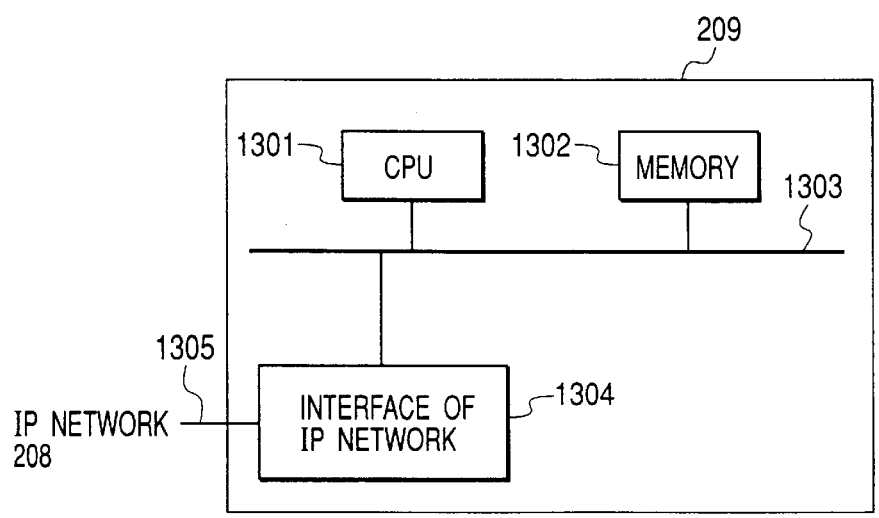
FIG. 13 is a block diagram showing a configuration of an SIP server.

A configuration of the SIP server 209 is shown in FIG. 13. The SIP server 209 holds the address information of the mobile terminal shown in FIG. 6, and includes: a CPU 1301 for executing the calculation processing by which the functions of realizing the flows of FIG. 3 and FIGS. 7–10 are realized; a memory 1302; an interface 1304 of IP network connected to a line 1305 through which the SIP server 209 is connected to the IP network 208; and an internal bus 1303 through which the CPU 1301, the memory 1302 and the interface 1304 of IP network are connected to one another.

Figure 15:
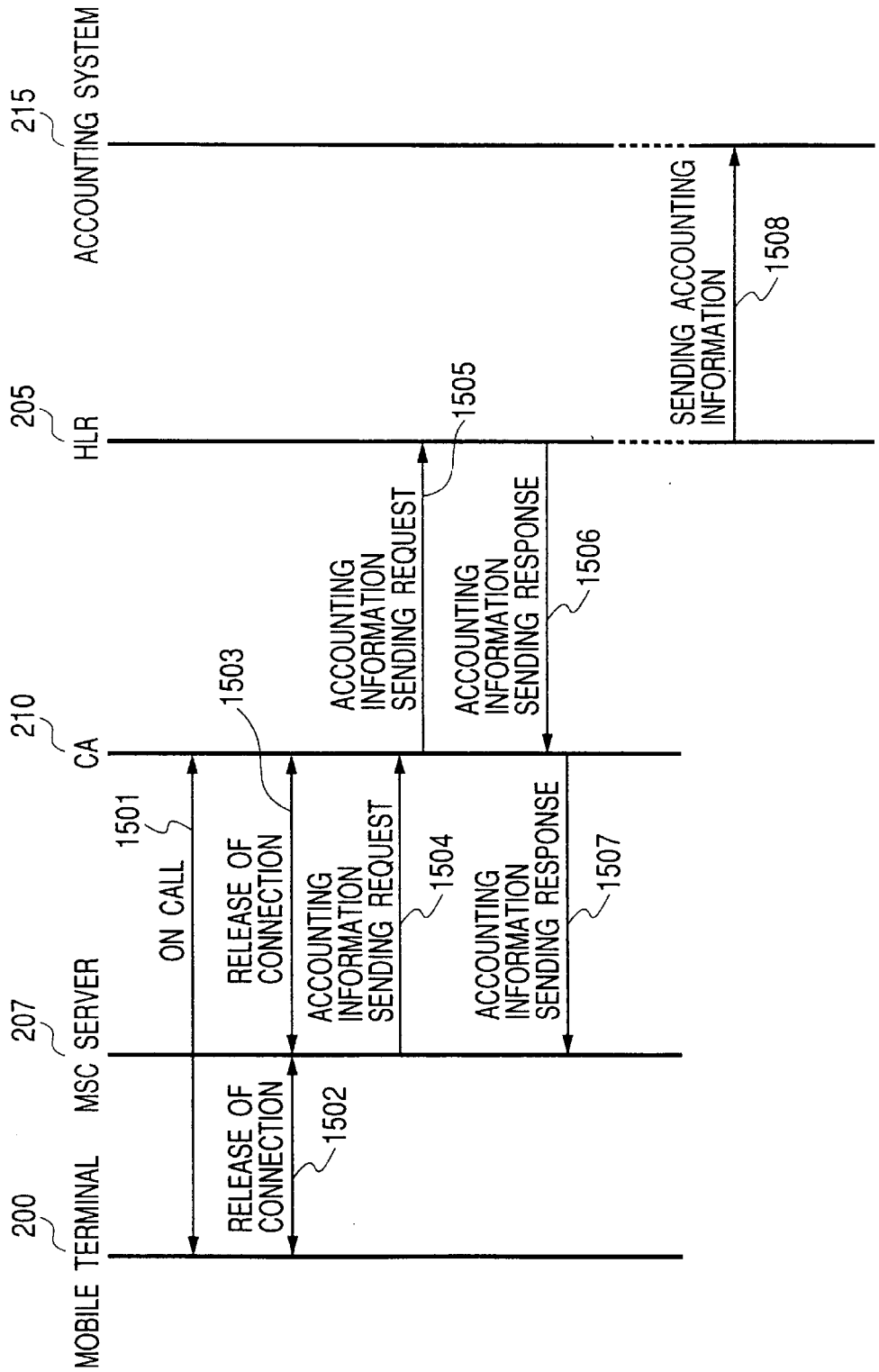
FIG. 15 is a flow chart for explaining the flow of sending accounting information after a mobile terminal accommodated in an IP network has completed a call.
Figure 16:
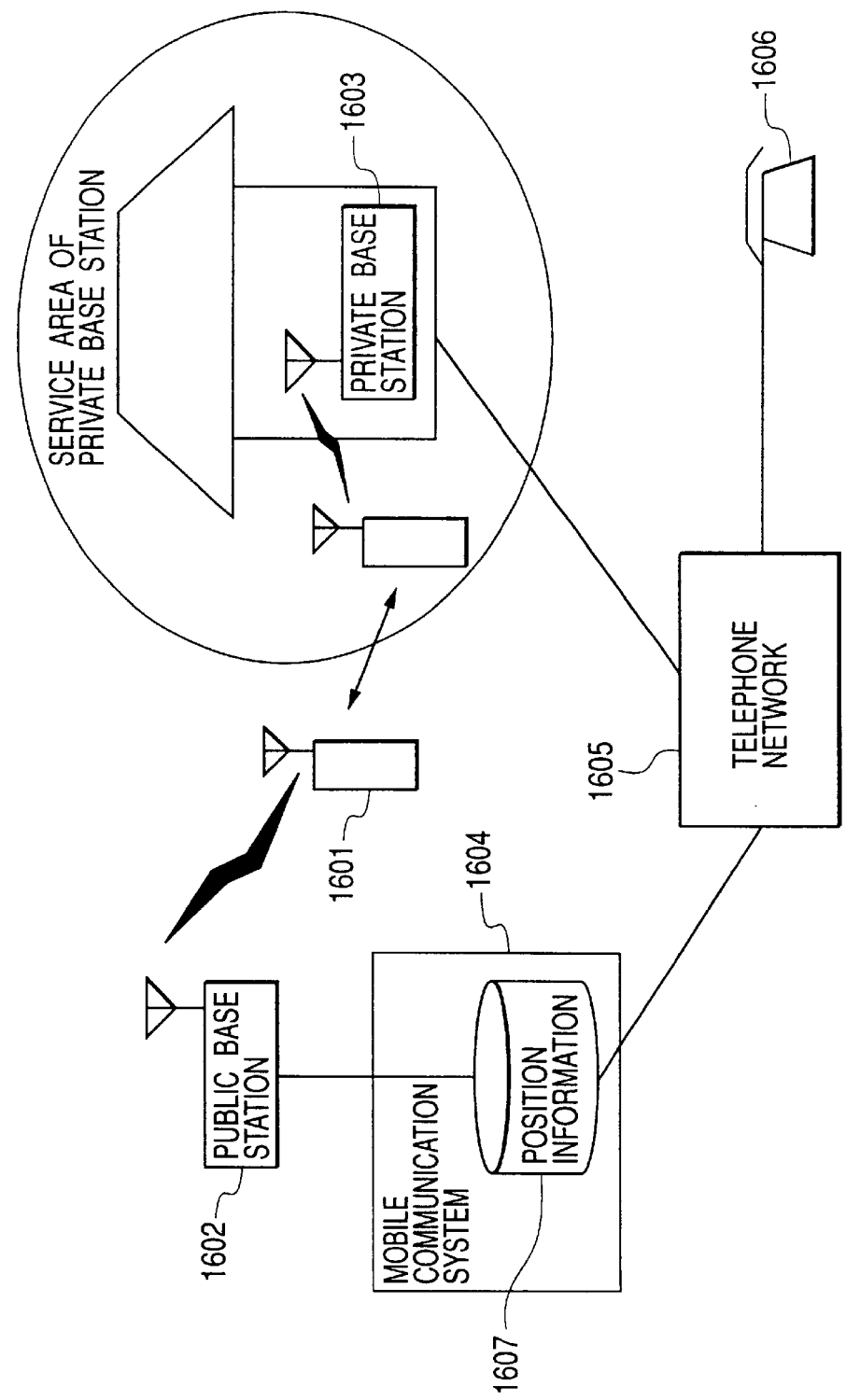
FIG. 16 is a schematic block diagram showing the construction of a conventional mobile communication system.

A sequence of sending accounting information after the mobile terminal 200 accommodated in the IP network 208 has completed a telephone call is shown in FIG. 15. It is assumed that the mobile terminal 200 is in call 1501 through the CA 210. If the request to complete a telephone call is made from the mobile terminal 200 or the CA 210, release 1502 of connection of the channel between the mobile terminal 200 and the MSC server 207, and release 1503 of connection of the channel between the MSC server 207 and the CA 210 are both carried out. Thereafter, the MSC server 207 sends an accounting information sending request 1504 in the form of the IP packet to the CA 210. The information relating to a time when the channel is connected between the mobile terminal 200 and the MSC server 207 due to the telephone call, or the number of packets which the mobile terminal 200 has sent/received to/from the MSC server 207, or both of them are contained in the accounting information sending request 1504. After having received the accounting information sending request 1504, the CA 210 converts the request 1504 into the signal of the line switching system to send the signal thus obtained in the form of an accounting information sending request 1505 to the HLR 205. The HLR 205 which has received the accounting information sending request 1505 records the information relating to the connection time or the number of packets or both of them in the form of the accounting information to send an accounting information sending response 1506 to the CA 210. After having received the accounting information sending response 1506, the CA 210 converts the accounting information sending response 1506 into the IP packet to send the IP packet in the form of an accounting information sending response 1507 to the MSC 207. The MSC server 207 which has received the accounting information sending response 1507 can be aware of that a series of sequences have been completed from the receipt of the accounting information sending response 1507. In addition, the HLR 205 which stores the accounting information sends the accounting information to the accounting system 215 at regular time intervals (1508).

Figure 14:
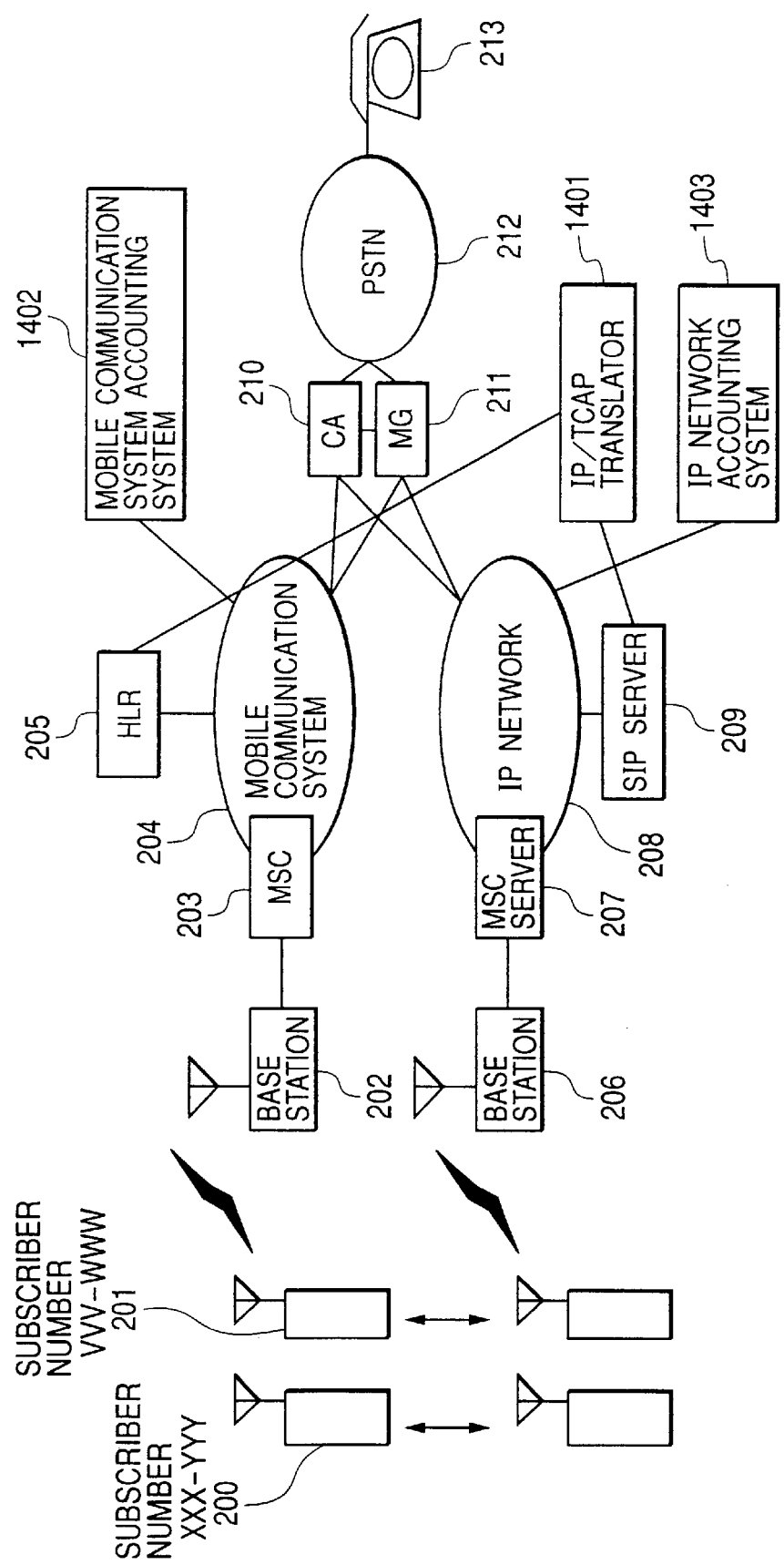
FIG. 14 is a schematic view showing a configuration of a mobile communication system according to a second embodiment of the present invention.

FIG. 14 diagrammatically shows the construction of a mobile communication system according to a second embodiment of the present invention. In FIG. 14, the constituent elements 201 to 214 are the same as those of FIG. 2. Reference numerals 200 and 201 designates respectively the mobile terminals which are accommodated in the mobile communication system through the radio channels. Reference numeral 202 designates the base station which is adapted to communicate with the mobile terminal 201 through the radio channel. The base station 202 is connected to the Mobile Switching Center (MSC) 203 through the communication line. Reference numeral 203 designates a part of the mobile communication system 204 which is adapted to carry out the communication in accordance with the line switching system, and the signal relating to the voice at the mobile terminal is transferred through the mobile communication system 204. Reference numeral 205 designates the Home Location Register (HLR) in which the position information of the mobile terminals 200 and 201 is registered when the mobile terminal 201 is connected to the mobile communication system 204 through the radio channel, the base station 202, and the mobile switching center 203. Reference numeral 206 designates the base station which is adapted to communicate with the mobile terminals 200 and 201 through the radio channels, respectively. The base station 206 is connected to the MSC server 207 through the communication line. Now, by the MSC server is meant the server which carries out the same operation as that of the MSC for the communication with the base station 206 to emmulate the MSC. In addition, the MSC server 207 has the function of converting the call control signal and the voice data which are sent from the base station into the IP packets to transfer these IP packets to the IP network 208 which is adapted to carry out the communication on the basis of the packet switching. In addition, the MSC server 207 has also the function of converting the IP packets received from the IP network 208 into the call control signal and the voice data. Reference numeral 209 designates the SIP (Session Initiation Protocol) server in which the position information of the mobile terminal 200 or 201 is registered when the mobile terminals 200 and 201 is connected to the IP network 208 through the radio channel, the base station 206, and the MSC server 207. Reference numeral 210 designates the Call Agent (CA) for converting the call control signal of the line switching system and the call control signal of the packet switching system into each other. Reference numeral 211 designates the Media Gateway (MG) for converting the voice calls having the mutually different formats into each other. The CA 210 and the MG 211 can communicate with each other, and the CA 210 carries out the direction, required for the call control, such as the resource reserving request to the MG 211. Reference numeral 212 designates the Public Switched Telephone Network (PSTN). Reference numeral 213 designates the general fixed telephone which is connected to the PSTN 212 through the communication line. Reference numeral 1402 and 1403 designates a mobile communication accounting system and an IP network accounting system which are connected to the HLR 205 and SIP server 209 through the mobile communication line and the IP network, respectively. The different three networks, i.e., the mobile communication system 204, the IP network 208, and the PSTN 212 are connected to one another via the CA 210 and the MG 211 through the communication lines. The mobile terminals which are accommodated in the mobile communication network 204 or the mobile terminals which are accommodated in the IP network 208 can communicate with each other through the radio channel, the base station, and the MSC or the MSC server.

In FIG. 14, unlike FIG. 2, an IP/TCAP translator 1401 is connected to the HLR 205 and the SIP server 209 through the communication lines, respectively. In the second embodiment, unlike the first embodiment, the position information registration sequences defined in FIG. 7 and FIG. 10 are carried out using the lines different from those in the network in which the terminal carries out the communication without through the CA 210, but through the IP/TCAP translator 1401.

In the communication relay system disclosed by the present application, the node for managing the position information of the mobile terminal(s) present in the line switching system, the node for managing the address information of the mobile terminal(s) present in the packet switching system, and the node through which the line switching system and the packet switching system are connected to each other are cooperated with one another. As a result, even when the mobile terminal of interest is accommodated either in the line switching system or in the packet switching system, the communication can be carried out between the mobile terminals. Furthermore, from this, the node for managing the position information, of the mobile terminal(s), which is used to realize the packet switching system of the overall mobile communication system, and for carrying out the communication in the form of the packet(s) can be previously installed, and hence the proceeding to the packet switching system can be carried out smoothly.

In addition, in the communication relay system of the present invention, the mobile terminal can communicate with other terminals without mounting, to the mobile terminal, the function of detecting the kind of base station and of judging that the communication is possible, and the function of sending the request to delete the position information itself or the request to receive/transfer the position information itself to the computer for carrying out the position information registration.

While the present invention has been particularly shown and described with reference to the embodiments, it will be understood that the various changes and modifications will occur to those skilled in the art without departing from the scope and true spirit of the invention. The scope of the invention is therefore to be determined solely by the appended claims.

What is claimed is:

1. A communication relay system which is connected to a line switched mobile communication system adapted to accommodate therein mobile terminals through radio channels, a packet switched mobile communication system adapted to accommodate therein mobile terminals through radio channels and a public switch adapted to accommodate therein fixed terminals, and which is adapted to relay communication between said line switched mobile communication system and said packet switched mobile communication system and communication between said line switched mobile communication system or said packet switched mobile communication system and said line switched public switch, wherein when a connection request is made from an associated one of said fixed terminals to the associated one of said mobile terminals which is accommodated either in said line switched mobile communication system or in said packet switched mobile communication system, said communication relay system is connected to said line switched mobile communication system to communicate with a computer for managing the position information of the mobile terminals, thereby judging whether the associated one of said mobile terminals as an object of the connection request is accommodated in said line switched mobile communication system or said packet switched mobile communication system to relay a signal which is sent from the associated one of said fixed terminals to the mobile communication system in which the associated one of said mobile terminals as an object of the connection request is accommodated.

2. A communication system comprising:

a packet switched mobile communication system including a subscriber switching center server and adapted to accommodate therein mobile terminals through radio channels;

a line switched mobile communication system including a subscriber switching center and adapted to accommodate therein mobile terminals through radio channels;

a relay system connected to said packet switched mobile communication system and said line switched mobile communication system;

a first computer connected to said packet switched mobile communication system and which is adapted to manage the position information of said mobile terminals accommodated in said packet switched mobile communication system; and a second computer connected to said line switched mobile communication system and adapted to manage the position information of said mobile terminals accommodated in said line switched mobile communication system, wherein after having received a request of position information registration through said subscriber switching center from a first mobile terminal, said first computer ensures a roaming number, registers subscriber information containing the roaming number and address information of said subscriber switching center server and notifies said second computer of the roaming number through said relay system, and said second computer registers the roaming number.

3. A communication system according to claim 2, wherein when a communication request has been made from a second mobile terminal accommodated in said line switched mobile communication system to said first mobile terminal, said second computer notifies said relay system of the roaming number, and said relay system retrieves said first computer with the roaming number as a key, thereby acquiring the address information of said subscriber switching center and converts a signal sent from said second mobile terminal into packet data to send the packet data thus obtained to said subscriber switching center server.

4. A communication system according to claim 2, wherein when said first mobile terminal has been moved to be accommodated in said line switched mobile communication system, said second computer registers the position information of said first mobile terminal and requests said first computer to delete the subscriber information through said relay system, and said first computer deletes the subscriber information in accordance with the request.

5. A communication system comprising:

a packet switched mobile communication system including a subscriber switching center server and adapted to accommodate therein mobile terminals through radio channels;

a line switched mobile communication system including a subscriber switching center and adapted to accommodate therein mobile terminals through radio channels;

a relay system connected to said packet switched mobile communication system and said line switched mobile communication system;

a first computer connected to said packet switched mobile communication system and adapted to manage the position information of said mobile terminals accommodated in said packet switched mobile communication system;

a second computer connected to said line switched mobile communication system and adapted to manage the position information of said mobile terminals accommodated in said line switched mobile communication system; and a translator connected to said first computer and said second computer and adapted to convert a call control signal used in said line switched mobile communication system and to carry out the reverse conversion thereof, wherein after having received a request of position information registration through said subscriber switching center from a first mobile terminal, said first computer ensures a roaming number, registers subscriber information containing the roaming number and address information of said subscriber switching center server and notifies said second computer of the roaming number through said translator, and said second computer registers the roaming number.

6. A communication system according to claim 5, wherein when a communication request has been made from a second mobile terminal accommodated in said line switched mobile communication system to said first mobile terminal, said second computer notifies said relay system of the roaming number, and said relay system retrieves said first computer with the roaming number as a key, thereby acquiring the address information of said subscriber switching center and converts a signal sent from said second mobile terminal into packet data to send the packet data thus obtained to said subscriber switching center server.

7. A communication system according to claim 5, wherein when said first mobile terminal has been moved to be accommodated in said line switched mobile communication system, said second computer registers the position information of said first mobile terminal and requests said first computer to delete the subscriber information through said relay system, and said first computer deletes the subscriber information in accordance with the request.

* * * * *